J. MANN.
INSECTICIDE DISTRIBUTER.
APPLICATION FILED MAR. 1, 1915.
1,176,388.
Patented Mar. 21, 1916.
3 SHEETS—SHEET 1.
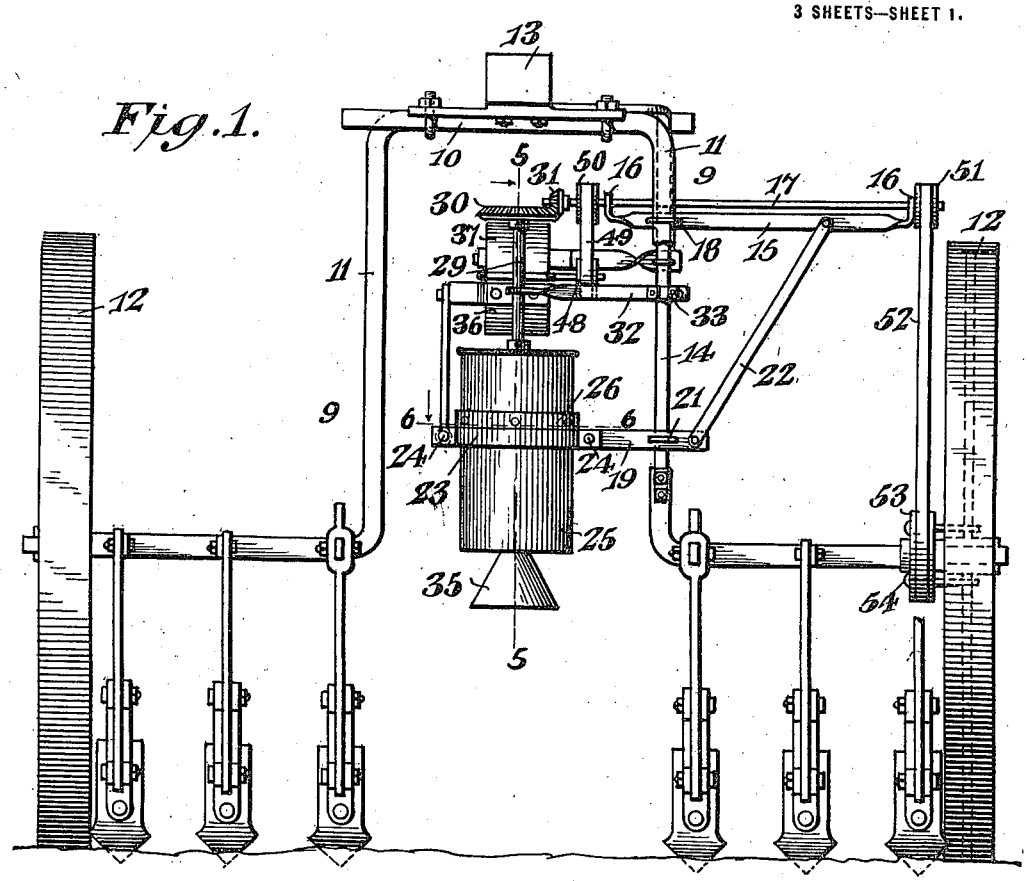
Fig. 1.
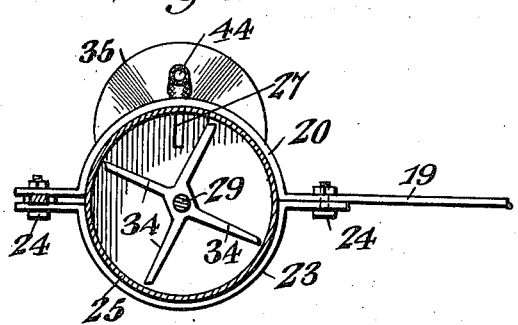
Fig. 6.
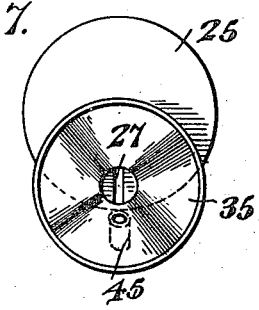
Fig. 7.
James Mann, Inventor
Witnesses
By 
his Attorney

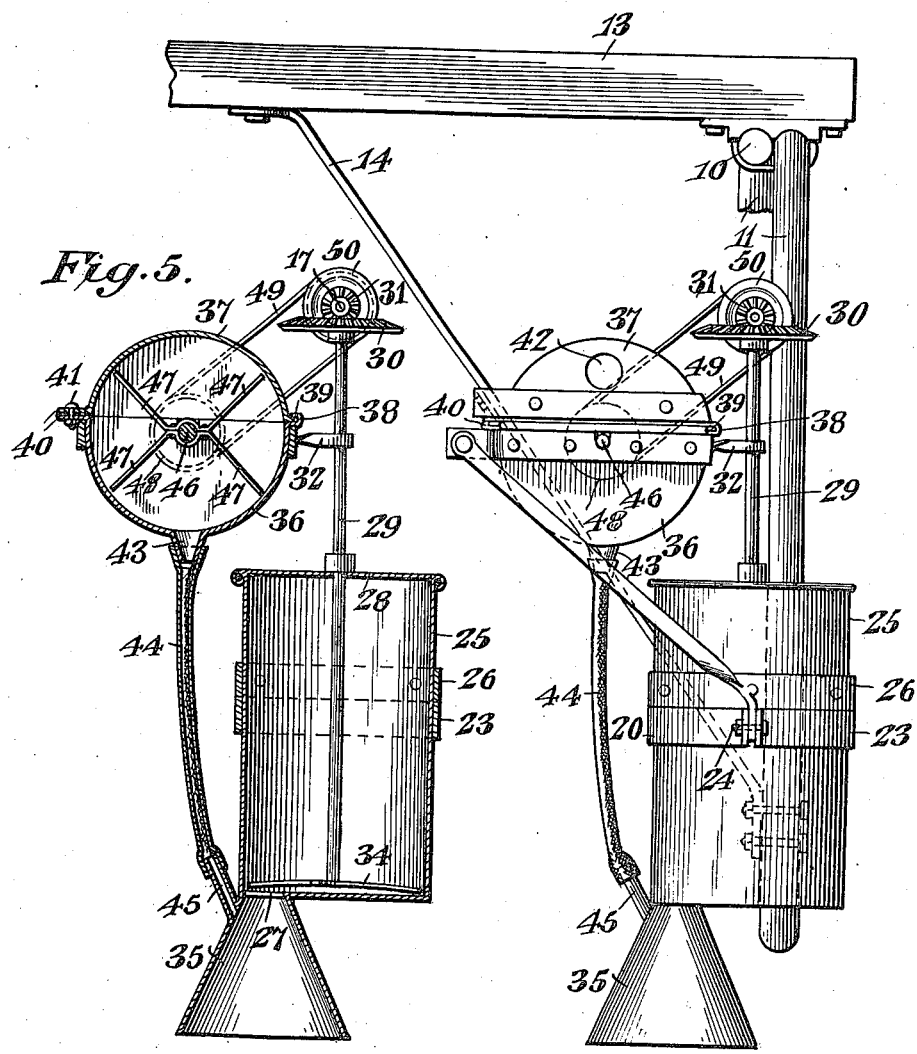

J. MANN.
INSECTICIDE DISTRIBUTER.
APPLICATION FILED MAR. 1, 1915.
1,176,388.
Patented Mar. 21, 1916.
3 SHEETS—SHEET 3.
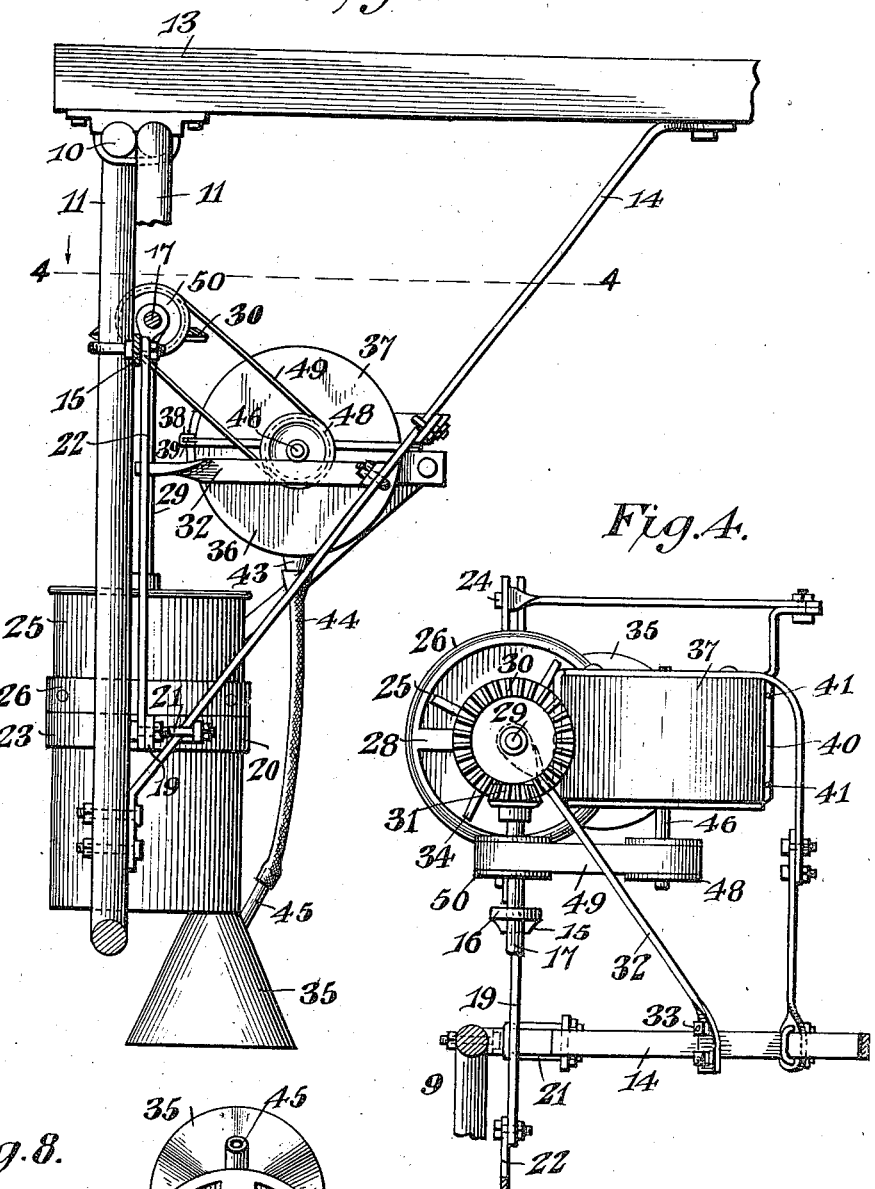
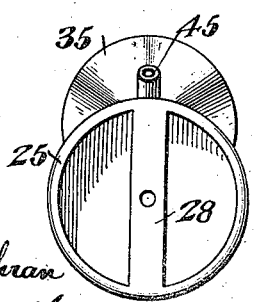
James Mann, Inventor

UNITED STATES PATENT OFFICE.

JAMES MANN, OF BONNER SPRINGS, KANSAS.

INSECTICIDE-DISTRIBUTER.

1,176,388.  Specification of Letters Patent.  Patented Mar. 21, 1916.

Application filed March 1, 1915. Serial No. 11,430.

*To all whom it may concern:*

Be it known that I, JAMES MANN, a citizen of the United States, residing at Bonner Springs, in the county of Wyandotte and State of Kansas, have invented new and useful Improvements in Insecticide-Distributers, of which the following is a specification.

The present invention relates to means for distributing insecticides upon growing plants, and one of the primary objects is to provide a simple and practicable mechanism that is in the form of an attachment which can be applied to an ordinary cultivator and is operated by and in conjunction with the same, so that insecticide may be applied to the plants while the same are being cultivated, the distribution of the insecticide being entirely automatic.

A further and important object is to provide a novel structure of this kind which can be made complete in itself and can be attached by a farmer to his cultivator without the necessity of modifying the latter in any material particulars.

An embodiment of the invention that has proven entirely practicable is illustrated in the accompanying drawings, wherein:—

Figure 1 is a rear elevation of a portion of a wheeled straddle-row cultivator showing the attachment in place thereon. Fig. 2 is a side elevation of the same. Fig. 3 is a view in elevation of the side opposite to that shown in Fig. 2. Fig. 4 is a horizontal sectional view on the line 4—4 of Fig. 3. Fig. 5 is a vertical sectional view on the line 5—5 of Fig. 1. Fig. 6 is a horizontal sectional view on the line 6—6 of Fig. 1. Fig. 7 is a bottom plan view of the reservoir and distributing nozzle. Fig. 8 is a top plan view of the same.

Similar reference numerals designate corresponding parts in all the figures of the drawings.

In the embodiment disclosed, a portion of a well known type of cultivator is illustrated and is designated generally by the reference numeral 9, only sufficient of the cultivator being shown in order to illustrate the application of the invention. Said cultivator includes an arched axle 10, the side members of which are designated 11, and on said axle are journaled the usual supporting wheels 12. A tongue 13 forms a part of the cultivator, and the axle is held in proper relation to the tongue by braces 14.

The insecticide distributer consists of a supporting frame having means for attachment to the frame of the cultivator. In the embodiment disclosed, a horizontally disposed shaft-carrying bar 15 is employed having upturned terminals 16 in which is journaled the main driving shaft 17. This bar 15 is secured at its inner end to the upright member 11 of the axle by a clip 18. A reservoir supporting yoke is employed comprising a bar 19, the inner portion of which is curved into a semi-circle 20, the outer portion being secured to the brace 14 by a clip 21. A brace bar 22 connects the outer end of the bar 19 with the bar 15. The other portion of the yoke 19 comprises a semicircular bar 23 corresponding to the semicircular portion 20 and secured to the bar 19 by bolts 24, or other suitable fasteners.

A cylindrical insecticide holding reservoir 25 is mounted in the yoke, being snugly surrounded by the portions 20 and 23, and being supported therein by a ring 26 secured to said reservoir and resting on the yoke. This reservoir is provided in its bottom with an eccentrically disposed discharge orifice in the form of a radial slot 27, and in its top is located a cross bar 28. A vertically disposed agitator shaft 29, journaled in the bottom and in the bar 28, projects above said reservoir and carries a beveled gear wheel 30 in mesh with a pinion 31 carried by the inner end of the drive shaft 17. A journal bearing for the upper portion of this shaft is provided in a brace bar 32 clipped as shown at 33 to the brace 14 of the cultivator. Mounted on the lower end of the shaft 29 is an agitator comprising a series of substantially radial arms 34, which sweep over the bottom of the reservoir and consequently across the discharge orifice 27. Suspended from the bottom of the reservoir 25, eccentrically thereof, is a downwardly flaring distributer, in the form of a nozzle 35, the upper smaller end of which is alined with the discharge orifice or slot 27, as will be evident by reference to Figs. 5 and 7. This distributing nozzle, as will be seen by reference to Fig. 1, is located centrally beneath the arch of the cultivator and between the sets of cultivating teeth, so that it will be disposed directly over the row of growing plants.

Arranged above and slightly in advance of the upper open end of the reservoir 25 is a fan casing consisting of a lower semi-cylindrical section 36 and an upper semi-cylindrical section 37, one of these sections having at one side an overhanging hook portion 38 engaging over a flanged portion 39, formed on the corresponding side of the other section, the opposite portions having flanges 40 detachably secured together, as shown at 41. The upper section 37 is provided with an air inlet opening 42, while the lower section has a depending tapered discharge nipple 43 over which is fitted the upper end of an air conduit 44 that may be in the form of a rubber tube. The lower end of this conduit is fitted upon a nipple 45 projecting from one side of the distributing nozzle 35, said nipple having a bore delivering into the upper portion of the nozzle at one side of the discharge orifice 27.

In the fan casing 36—37 is a rotary fan comprising a shaft 46 carrying fan blades 47, and said shaft has on the end projecting from the casing a pulley 48 over which passes a belt 49 that passes around another pulley 50 carried by the main driving shaft 17. The outer end of said driving shaft 17 is provided with a pulley 51 around which passes a belt 52 that is driven by a pulley 53 having suitable means as 54 by which it can be attached to an ordinary cultivator wheel. The pulley in the present instance is shown as being on the inside of the wheel 12, but it is evident that it may as readily be on the outside.

With the mechanism disclosed, it will be evident that as the cultivator is drawn over the plants and the cultivating operation takes place, the shaft 17 will be rotated from the cultivator wheel 12. As a result, the agitator will be rotated in the reservoir and the fan will be driven at a relatively high speed. If, therefore, insecticide is placed in the reservoir (and this can be readily done as its upper end is open and in rear of the fan casing) the same will pass downwardly in a small stream into the flaring nozzle. Here it will be struck by the blast of air, which will cause it to be greatly agitated, and it will issue from the lower larger end of the nozzle 35 in a cloud so that it will evenly distribute and settle upon the plants over which the machine passes. It will be evident that this device is complete as an attachment and can be readily applied to practically any well known form of distributer, without special tools and without the necessity of materially altering the same.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In apparatus of the character set forth, the combination with a supporting frame, including a shaft-carrying bar, a fan-supporting bar and a reservoir-supporting bar, of braces connecting the bars, means for attaching the bars to the frame of a cultivator, a shaft journaled on the shaft-carrying bar, a reservoir supported on the reservoir-supporting bar and a fan carried by the fan-supporting bar, an agitator in the reservoir geared to the shaft, driving connections between the shaft and fan, and means for driving the shaft from the wheel of a cultivator on which the attachment is mounted.

2. In apparatus of the character set forth, the combination with a substantially horizontal frame-supporting bar, of means for securing the same at one end to the frame of a cultivator, a reservoir-supporting yoke including a bar, means for connecting the bar at one end to the frame of a cultivator, a brace between the yoke bar and the shaft-carrying bar, a fan supporting bar, means for attaching the bar to the frame of a cultivator, a brace between the fan-supporting bar and the reservoir-supporting yoke, a reservoir located in said yoke and seated thereon, said reservoir having an eccentrically disposed bottom discharge opening, a flaring distributing nozzle mounted eccentrically on said bottom and surrounding the opening, a rotary agitator arranged within the reservoir and including a vertically disposed shaft, a substantially horizontal driving shaft journaled on the shaft-carrying bar and geared to the vertical shaft of the agitator, a fan casing mounted on the fan-supporting bar, a conduit leading from the fan casing into the distributing nozzle, a rotary fan journaled in the casing, a gear connection between the fan and the driving shaft, a driving pulley having means for attachment to the wheel of the cultivator, and a driving connection between the pulley and the driving shaft.

In testimony whereof I have hereunto set my hand in presence of two subscribing witnesses.

JAMES MANN.

Witnesses:
 LEO M. WAGNER,
 L. G. FRISBIE.